Sept. 18, 1962 J. COLAGROSSI ETAL 3,054,959
GENERATOR OF PULSES OF MAXIMUM WIDTH UTILIZING DIRECT "TURN-ON" PULSE AND DELAYED, INVERTED "TURN-OFF" PULSE
Original Filed Sept. 17, 1958
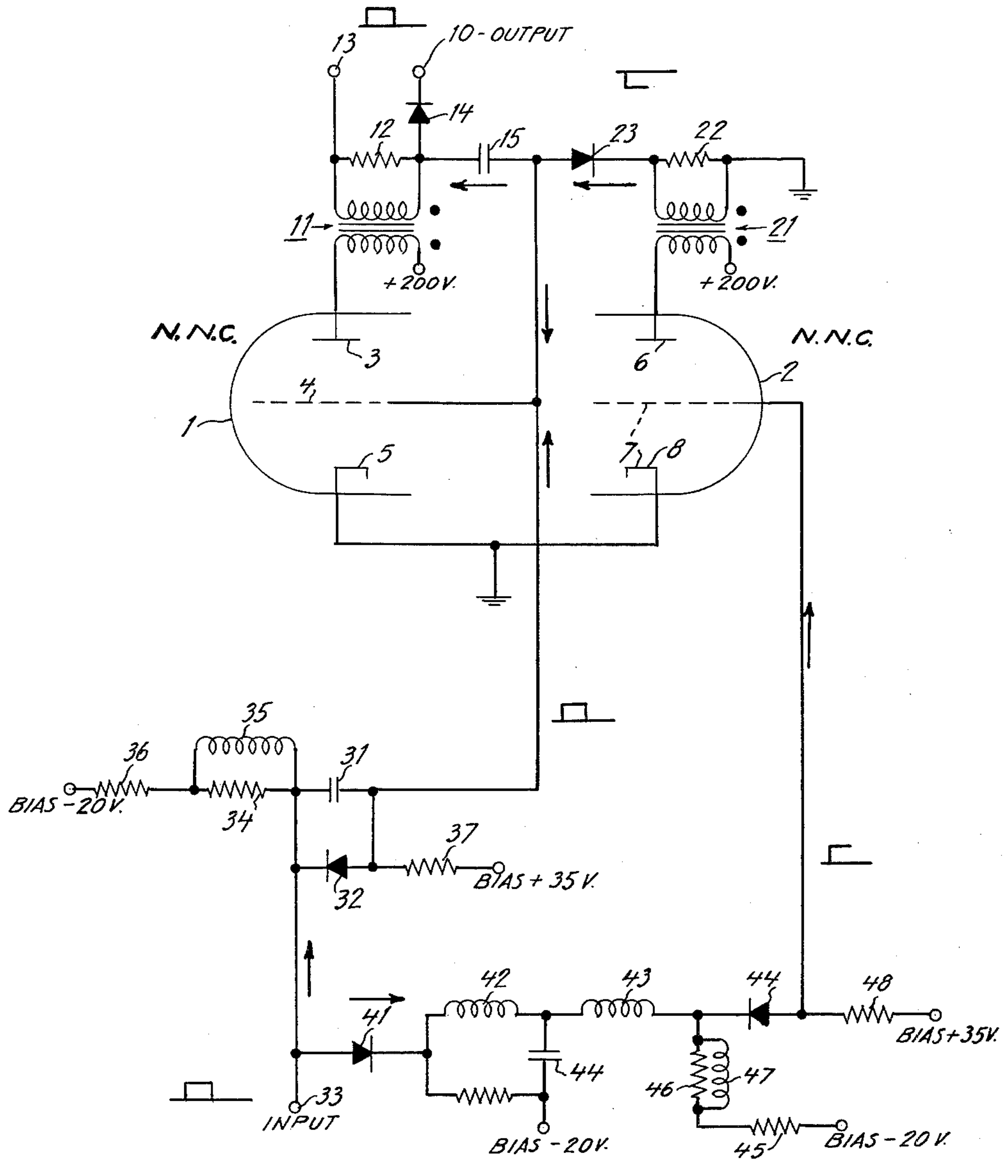
INVENTORS
JOSEPH COLAGROSSI
WARREN R. WINES
BY William Grolman
ATTORNEY United States Patent Office 3,054,959

Patented Sept. 18, 1962

3,054,959

GENERATOR OF PULSES OF MAXIMUM WIDTH UTILIZING DIRECT "TURN-ON" PULSE AND DELAYED, INVERTED "TURN-OFF" PULSE

Joseph Colagrossi, Stratford, and Warren R. Wines, Norwalk, Conn., assignors to Sperry Rand Corporation, New York, N.Y., a corporation of Delaware Continuation of application Ser. No. 761,630, Sept. 17, 1958, now Patent No. 2,954,731, dated Oct. 4, 1960. This application Oct. 21, 1959, Ser. No. 847,717

3 Claims. (Cl. 328—58)

This invention relates to trigger circuits, and, more particularly, to trigger circuits which provide output pulses of prescribed width.

This application is a continuation of the copending application S.N. 761,630, entitled "Electronically Controlled High Speed Printer," filed on September 17, 1958, in the names of Daniel C. Durand and Warren R. Wines, now Patent 2,954,731, issued on Ocotber 4, 1960 .

Since the advent of digital computers, the utilization of pulse techniques and pulse circuits has greatly expanded. Not only have new circuits and systems been developed to fill specific needs and to solve particular problems, but the number of problems themselves has also increased. A major problem has long been the maintenance, or the reestablishment, of the shape, timing and width of pulses in a pulse system. In synchronous digital computers and pulse information processing systems, the reformation of pulses which are degenerated by passage through gates, buffers, amplifiers, storage lines, and the like is necessary. One device for the reformation of such degenerated pulses used the combination of a coincident gate with a one-shot multivibrator (delay flop). When the degenerated pulse and a timing pulse were both applied to the gate, the multivibrator was triggered and generated an output signal for the time interval determined by the time constants of the circuit. This type of circuit required timing pulses and gates.

It is an object of this invention to provide a new and improved trigger circuit.

It is another object of this invention to provide a new and improved circuit for generating pulses.

It is a further object of this invention to provide a new and improved trigger circuit for generating pulses of predetermined size and shape when triggered by appropriate input signals.

It is still a further object to provide a new and improved trigger circuit for providing a pulse of the same size and shape as an input signal except when the input signal exceeds a predetermined maximum width.

Other objects and advantages of this invention will become apparent as the following description proceeds, which description should be considered together with the accompanying drawing in which the single FIGURE schematically shows the circuit of the trigger of this invention.

Briefly, in accordance with one embodiment of the invention an input electrical pulse is applied to the control grid of a first triode to enable the triode to conduct so that an output pulse appears on the plate circuit of the first triode. Simultaneously, the leading portion of the input electrical pulse is fed into a delay line means. The output of the delay line means is coupled with the control grid of a second triode. After a period of time, depending on the parameters of the delay line means and on the shape of the input pulse's leading portion, the second triode is set to a conduction state. The plate circuit of the second triode is coupled to the control grid of the first triode. When the second triode conducts, the output from its plate circuit causes the first triode to cut-off; that is, stop conducting. Thus, the period of time during which the first triode is conductive is determined by the time required for the leading edge of the input pulse to be translated through the delay line means. Resistance-capacitance coupling among the plate circuits of both triodes and the control grid of the first triode functions to shape the trailing edge of the output pulse from the plate circuit of the first triode in response to the shape of the leading edge of the input electrical pulse.

Referring now to the drawing in detail, the trigger circuit comprises two triodes or other electric valves, 1 and 2. Triode 1 comprises an anode 3, a control grid 4, and cathode 5; and the triode 2 comprises an anode 6, a control grid 7 and cathode 8. The cathode 8 is connected to cathode 5 and both are directly connected to ground. Anode 3 of the triode 1 is connected through the primary of a transformer 11 to a source of +200 volts, the secondary of the transformer 11, having resistor 12 connected across it, being connected to output terminal 10 through a diode 14. Anode 6 of the triode 2 is connected through the primary of transformer 21 to a source of +200 volts; its secondary having a resistor 22 connected across it with one end connected directly to ground. Control grid 4 of the triode 1 is connected to one end of a capacitor 15, the other end of which is connected to one end of the secondary of the transformer 11, and also to one end of a diode 23, the other end of which is connected to the ungrounded side of the secondary of transformer 21. The control grid 4 of the triode 1 is also connected through a resistor 37 to a source of +35 volts and across a parallel arrangement of a capacitor 31 and a diode 32 to the input terminal 33. The input terminal 33 is also connected to a source of —20 volts through a high impedance combination of a resistor 34 and a choke 35 and a limiting resistor 36. Also connected to the input terminal 33 is a diode 41 feeding a delay line having a first section 42 and a second section 43. A shunt capacitor 44 is connected between the junction of the two sections 42 and 43 and a source of —20 volts. The other end of the delay line is connected through a diode 44 to the control grid 7 of the triode 2 which is also connected to a source of +35 volts through a resistor 48. A source of —20 volts is connected through a limiting resistor 45 and a high impedance comprising a resistor 46 which has a choke 47 wrapped about it.

In operation, a pulse is applied to the input terminal 33 and through the interconnecting circuitry including capacitor 31 to the control grid 4 of the triode 1 to turn the triode on. This draws current through the primary of transformer 11, lowering the voltage on anode 3 and producing a positive going output potential at the output terminal 10. In the meantime, the leading edge of the input pulse applied to the terminal 33 is delayed in the two section delay line 42 and 43 and is later applied to the control grid 7 of triode 2.

If the pulse applied to the control grid 4 has not yet decayed, the leading edge of the delayed pulse will cause the potential at the junction of diode 44 and resistor 48 to be raised sufficiently to turn on triode 2, lowering the potential at the anode 6, and generating a negative going potential at the diode 23, which negative-going potential passes through the diode 23, disabling the control grid 4 to turn off the tube 1. Thus, the period of time during which the triode 1 is conductive is controlled by the time required for the leading edge of the input pulse to be applied through the delay line 42 and 43 and the triode 2 to the control grid 4 of the triode 1.

The application of the negative-going potential to control grid 4 by diode 23 also causes a negative-going pulse to pass through capacitor 15. This increases the rapidity with which the positive-going output pulse generated across the resistor 12 decays, ensuring a steep trailing edge to the output pulse at terminals 10 and 13.

This specification has described a new trigger circuit for generating output pulses of predetermined size and shape when triggered. It is realized that the specification may indicate to those skilled in the art other forms in which the principles of this invention may be utilized, and is therefore intended that this invention be limited only by the scope of the appended claims.

What is claimed is:

1. A circuit, for generating pulses of predetermined maximum width, comprising: first normally non-conducting electric valve means; second electric valve means; first conduction control means for said first valve means; second conduction control means for said second valve means; means for normally inhibiting conduction in said second valve means; signal source means for applying an input signal to said first conduction control means for causing said first valve means to conduct for the duration of time said input signal is applied to said first conduction control means; delay line means connected at one end to said signal source means and at the other end to said inhibiting means, responsive to the initiation of said input signal, for neutralizing the effect of said inhibiting means and causing said second conduction control means to initiate conduction in said second valve means at a time subsequent to the initiation of conduction in said first valve means; and additional conduction control means, responsive to said second valve's conduction, for causing said first conduction control means to terminate conduction in said first valve means.

2. A circuit for generating pulses of predetermined width comprising: a first multi-electrode element including an output electrode and a control electrode; a second multi-electrode element including an output electrode and a control electrode; signal source means for applying an input signal to said first element's control electrode for causing an output signal representative of the input signal to occur at said first element's output electrode; delay line means, responsive to the initiative of said input signal for subsequently applying a portion of said input signal to said second element's control electrode whereby a control signal occurs at said second element's output electrode; and, additional means, responsive to said control signal, for disabling said first element's control electrode and accelerating the decay of the terminal portion of the output signal.

3. A circuit, as defined in claim 2, wherein the additional means comprises a capacitor serially coupled with said second element's output electrode and with said first element's output electrode.

References Cited in the file of this patent

UNITED STATES PATENTS

| | | |
|---|---|---|
| 2,266,154 | Blumlein | Dec. 16, 1941 |
| 2,447,082 | Miller | Aug. 17, 1948 |
| 2,617,883 | Anger | Nov. 11, 1952 |
| 2,707,751 | Hance | May 3, 1955 |

FOREIGN PATENTS

| | | |
|---|---|---|
| 667,481 | Great Britain | Mar. 5, 1952 |
| 676,328 | Great Britain | July 23, 1952 |